US007857694B2

(12) United States Patent
Aida

(10) Patent No.: US 7,857,694 B2
(45) Date of Patent: Dec. 28, 2010

(54) GAMING MACHINE, METHOD AND COMPUTER PROGRAM FOR CONTROLLING THE SAME, AND COMPUTER-READABLE STORAGE MEDIUM HAVING THE PROGRAM STORED THEREIN

(75) Inventor: Eiji Aida, Tokyo (JP)

(73) Assignee: Konami Gaming, Inc., Las Vegas ( * ) Notice: Subject to any disclaimer, the term of this patent is extended or adjusted under 35 U.S.C. 154(b) by 776 days.

(21) Appl. No.: 10/499,991

(22) PCT Filed: Jul. 7, 2003

(86) PCT No.: PCT/JP03/08607

§ 371 (c)(1), (2), (4) Date: Jun. 24, 2004

(87) PCT Pub. No.: WO2004/004854

PCT Pub. Date: Jan. 15, 2004

(65) Prior Publication Data

US 2005/0079907 A1 Apr. 14, 2005

(30) Foreign Application Priority Data

Jul. 8, 2002 (JP) ............................ 2002-199336

(51) Int. Cl.
*A63F 13/00* (2006.01)
*A63F 9/24* (2006.01)

(52) U.S. Cl. ............................ 463/20; 463/12; 463/13; 273/143 R

(58) Field of Classification Search ....................... None
See application file for complete search history.

(56) References Cited

U.S. PATENT DOCUMENTS

| | | | | | |
|---|---|---|---|---|---|
| 4,448,419 | A | * | 5/1984 | Telnaes | 463/21 |
| 4,711,451 | A | * | 12/1987 | Pajak et al. | 463/22 |
| 5,209,479 | A | * | 5/1993 | Nagao et al. | 463/21 |
| 5,380,007 | A | * | 1/1995 | Travis et al. | 463/18 |
| 5,580,053 | A | * | 12/1996 | Crouch | 463/20 |
| 5,855,514 | A | * | 1/1999 | Kamille | 463/17 |
| 6,190,254 | B1 | * | 2/2001 | Bennett | 463/13 |
| 6,604,999 | B2 | * | 8/2003 | Ainsworth | 463/20 |

OTHER PUBLICATIONS

PAJ tranlsation of JP06-246043, Sanyo KK.*

* cited by examiner

*Primary Examiner*—M. Sager
(74) *Attorney, Agent, or Firm*—Masuvalley & Partners

(57) ABSTRACT

A display includes a plurality of display areas connected with each other, each operable to variably and stationarily display one kind of plural hexagonal indicium. A controller determines a win occurrence, in a case where an identical kind of indicium are stationarily displayed on at least two of the display areas which are adjacently arranged on the display.

6 Claims, 14 Drawing Sheets

GAMING MACHINE, METHOD AND COMPUTER PROGRAM FOR CONTROLLING THE SAME, AND COMPUTER-READABLE STORAGE MEDIUM HAVING THE PROGRAM STORED THEREIN

TECHNICAL FIELD

The invention relates to a gaming machine, such as a token gaming machine, or a slot machine, and more particularly, to a gaming machine that offers conditions which can become advantageous to a player depending on the state of indicium stationarily displayed on a display.

BACKGROUND ART

As shown in FIGS. 15A and 15B, a first related-art gaming machine has a display 12 comprising a plurality of display areas (a.sub.11, a.sub.12, . . . , a.sub.33) having a rectangular shape. The respective display areas are arranged into a matrix pattern. When results displayed in the plurality of display areas are brought into a predetermined display pattern along, e.g., a line extending in the direction of a row or a diagonal line (in FIG. 15A a combination of indicium "7" is established along a line extending in the direction of a row; that is, a.sub.21-a.sub.22-a.sub.23), a condition which can become advantageous to the player is offered.

A second related-art gaming machine described in Japanese Patent Publication No. 6-246043A is provided as a more attractive gaming machine in comparison with the first related-art gaming machine shown in FIG. 15A. In the second related-art gaming machine, hexagonal indicium are displayed in the display 12 as shown in FIG. 15B. When display results appearing in a predetermined number or more of display regions from among a plurality of display areas (b.sub.21, b.sub.41, b.sub.12, b.sub.32, b.sub.52, b.sub.23, and b.sub.43) are arranged into a specific display pattern; more specifically, when specific indicium are displayed in a predetermined number or more of display areas or when indicium "FRUIT" are displayed in all the display areas, a combination of specific display patterns is established, whereupon a predetermined gaming value is offered.

The geometries of indicium to be displayed in the display are made different from a conventional geometry of indicia in such a manner as mentioned above, thereby imparting enhanced amusement for the player.

However, in order to provide a highly-renewed gaming characteristic, a condition for imparting a predetermined gaming value in accordance with a novel pattern of indicia is required. In relation to the conventional condition; that is, when display results appearing in a predetermined number of display areas or more constitute a specific display pattern, a restriction of "a predetermined number or more of display areas" might spoil the player's pleasure.

As shown in FIG. 15B, in a gaming machine, indicia constituting a first reel is displayed in display areas a.sub.21-b.sub.41; indicia constituting a second reel is displayed in display areas b.sub.12-b.sub.32-b.sub.52; and indicia constituting a third reel is displayed in display areas b.sub.23-b.sub.43. Display of four or more specific indicium in the display areas is presumed to be a condition for offering a gaming value. In a certain situation; namely, when no specific indicia is stationarily displayed in the display areas b.sub.21, b.sub.41 as a result of stoppage of the first reel, and only one specific indicia is stationarily displayed in the display areas b.sub.12, b.sub.32, and b.sub.52 as a result of stoppage of the second reel, there is no longer a chance for satisfying the condition for offering a gaming value. Therefore, in spite of the player's pleasure remaining spoiled, the third reel continues changing.

In a case where a condition for offering a gaming value is set for each type of indicia arrangement, such as display of four or more indicium "7" and display of all indicium "FRUIT," the player must ascertain individual conditions for offering a gaming value beforehand. Also, the player encounters difficulty in intuitively ascertaining, within a short time period, whether or not the condition for offering a gaming value has been satisfied. This is likely to result in creation of a problem of arousing a feeling of repulsion in a player who is playing the game for the first time or a problem of the player being unable to understand the condition and being bewildered.

Further, a condition for offering a gaming value may also be determined as occurrence of a predetermined display pattern in certain locations within the display areas of the display. When specific indicium are displayed in spaced display regions, the player encounters greater difficulty in intuitively ascertaining, within a short time period, whether or not the condition is satisfied, to a degree corresponding to the distance between the display regions. In contrast, under the condition that specific indicium must appear at all display areas, the player's pleasure is spoiled if that specific indicia has failed to appear at one display area. Hence, such a condition forms a barrier to further enhancement of a gaming characteristic.

DISCLOSURE OF THE INVENTION

It is therefore an object of the invention to provide a gaming machine which employs novel patterns of indicium to be displayed in a display for enhancing amusement for a player; which decreases complexity of conditions for offering a gaming value as conditions having a gaming characteristic corresponding to the novel patterns; which makes the conditions visually and intuitively ascertainable; and which is easy for a beginner or a casual player to understand.

It is also an object of the invention to provide a method and a computer program for controlling the gaming machine, and a computer-readable storage medium having the computer program stored therein.

In order to achieve the above object, according to the invention, there is provided a gaming machine, comprising:

a display, including a plurality of display areas connected with each other, each operable to variably and stationarily display one kind of plural hexagonal indicium; and a controller, which determines a win occurrence, in a case where an identical kind of indicium are stationarily displayed on at least two of the display areas which are adjacently arranged on the display.

According to the invention, there is defined a so-called condition for offering a gaming value; that is, a condition for offering a status which can become advantageous to a player in a case where identical hexagonal indicium are adjacent to each other.

Here, in relation to the expression "display including a plurality of display areas," the only requirement is to be able to ascertain that the display is formed from a plurality of display areas as a result of the indicium being displayed in the respective display areas even when the respective display areas are not definitely partitioned. No limitation is imposed on the physical configuration of the display areas.

The expression "hexagonal" includes a case where indicium of hexagonal shapes are prepared and a case where any measure to make the indicium hexagonal, such as provision of a hexagonal display area, is taken. Namely, if indicium are displayed in the display so that the player can ascertain the indicium as being hexagonal, these indicium fall within the concept of "hexagonal."

The expression "connected" can be conceived as showing a state in which the indicium are physically connected together and a state in which the indicium are not connected together but can be virtually ascertained by the player as if being connected together in association with variable display of the indicium. Connection of the hexagonal indicium can be embodied in two ways: that is, sides of hexagonal indicium being connected together, and angles of the hexagonal indicium being connected together.

The expression "adjacent" refers to a relationship in which indicium are arranged side by side; in other words, a plurality of display areas relatively adjoining to each other in a vertical, horizontal, upwardly-sloping, or downwardly-sloping direction. The only requirement is at least one line which can constitute an adjacent relationship is established in somewhere on the display. No limitation is imposed on the number of indicium. The only requirement is that indicium are merely adjacent to each other.

In such a configuration, the player can easily, intuitively grasp the adjacent relationship, and hence the player can ascertain whether or not a win has arisen within a short time period.

Preferably, a line connecting two display areas situated both ends of the display areas showing the identical kind of indicium and adjacently arranged is regarded as a winning line.

In such a configuration, when many adjacent relationships are established, a status which can become more advantageous to the player can be provided. Further, complexity of the condition for offering a gaming value, which would otherwise be caused by the adjacent relationship, can be prevented.

Preferably, the win occurrence is determined except a case where an identical kind of indicium are stationarily displayed on the display areas which are adjacently arranged in either an immediate horizontal direction or an immediate vertical direction.

In such a configuration, complexity of a condition for offering a gaming value for an adjacent relationship can be eliminated. Therefore, the condition for offering a gaming value can be visually and intuitively ascertained.

More specifically, as shown in FIG. 5, in connection with the indicium stationarily displayed in the display 12, the identical indicium ".circle-solid." are displayed in a plurality of display areas b.sub.11, b.sub.22, b.sub.33, b.sub.44, b.sub.31, and b.sub.42 and adjacent to each other. Three possible patterns are available; namely, six identical indicium ".circle-solid." "b.sub.42-b.sub.31-b.sub.11-b.sub.22-b.sub.33-b-.sub.44" being connected together; four identical indicium ".circle-solid." "b.sub.11-b.sub.22-b.sub.33-b.sub.44"; or two identical indicium ".circle-solid." "b.sub.31-b.sub.42." By the condition that a relationship in which indicium are adjacent to each other in the immediate vertical direction should not be included, the connection pattern "b.sub.11-b.sub.31" (or "b.sub.22-b.sub.42") is excluded. Eventually, the four indicium "b.sub.11-b.sub.22-b.sub.33-b.sub.44" and the two indicium "b.sub.31-b.sub.42" are set as adjacent relationships, which offer a status which can be advantageous to the player.

Accordingly, when a shift arises to a status which can become more advantageous to the player or when complicate interconnection patterns arise among a plurality of identical adjacent indicium, establishment of two patterns; that is a pattern formed by connection of four indicium and a pattern formed by connection of two indicium, is more effective than establishment of a pattern formed by connection of six indicium, as a condition for eliminating complexity of a condition for offering a gaming value.

According to the invention, there is also provided a gaming machine, comprising:

a display, including a plurality of first display areas connected with each other, each operable to variably and stationarily display one kind of plural octagonal indicium, and a plurality of second display areas separated from each other and connected with four of the first display areas, each operable to variably and stationarily display one kind of plural rectangular indicium; and a controller, which determines a win occurrence, in a case where an identical kind of indicium are stationarily displayed on at least two of the first display areas and the second display areas which are adjacently arranged on the display.

In such a configuration, the condition for offering a gaming value is determined by a simple condition although a novel display pattern for the display, that is, a mixture of the rectangular indicium and the octagonal indicium is provided. The player can visually and intuitively grasp the condition for offering a gaming value. Hence, a beginner player or a casual player can also readily and quickly understand the condition.

Specifically, the octagonal indicium are displayed in first display areas A.sub.11, A.sub.12, . . . , A.sub.33 as shown in FIG. 6A. The indicium to be displayed in the first display area are displayed while being connected together over a plurality of display regions. Rectangular indicium are displayed in the second areas a.sub.1, a.sub.2, . . . a.sub.4. The indicium to be displayed in the second display areas are displayed while being spaced over the plurality of display areas.

As shown in FIG. 6B, the indicia ".cndot." are stationarily displayed in the first display areas A.sub.11, A.sub.12, and A.sub.13. When the indicium ".cndot." are stationarily displayed in the second display areas a.sub.1, a.sub.2, the identical indicium ".cndot." are adjacent to each other. Hence, five indicium ".cndot." are connected together, thereby offering a status which can be advantageous to the player.

Preferably, a line connecting two display areas situated both ends of the display areas showing the identical kind of indicium and adjacently arranged is regarded as a winning line.

In such a configuration, when many adjacent relationships are established, a status which can become more advantageous to the player can be provided. Further, complexity of the condition for offering a gaming value, which would otherwise be caused by the adjacent relationship, can be prevented.

According to the invention, there is also provided a gaming machine, comprising:

a display, including a plurality of first display areas connected with each other, each operable to variably and stationarily display one kind of plural octagonal indicium, and a plurality of second display areas separated from each other and connected with four of the first display areas, each operable to variably and stationarily display one kind of plural rectangular indicium including a mark connecting at least two of the four first display areas; and a controller, which determines a win occurrence, in a case where an identical kind of indicium are stationarily displayed on at least two of the first display areas connected by the mark stationarily displayed on at least one of the second display areas.

In such a configuration, there is provided a novel manner to display indicium; that is, display of rectangular indicium and octagonal indicium are displayed in the display. Even in a gaming machine adopting such a novel display way, a condition for offering a gaming value is set on the basis of a simple condition that identical indicium are adjacent to each other with interposition of rectangular indicium in connection with establishment of a relationship of octagonal indicium being adjacent to each other. Hence, the condition for offering a gaming value is visually and intuitively ascertainable. Hence, a beginner or casual player can also comprehend the condition quickly.

Specifically, as shown in FIG. 7, marks, which virtually interconnect indicium to be displayed in the plurality of first display areas (e.g., A.sub.21, A.sub.22, A.sub.31, A.sub.32) adjacent to the second display area (e.g., a.sub.3 in FIG. 6A), may be displayed in the second display areas. A determination can be made as to whether or not the indicium to be displayed in the plurality of first display areas are to be connected together by the mark displayed in the second display area.

According to the example shown in FIG. 7, the identical indicium ".cndot." are stationarily displayed in the first display areas A.sub.11, A.sub.12, A.sub.13, A.sub.22, and A.sub.33. In relation to the second display areas, a "mark for interconnecting indicium in a right sloping direction" is stationarily displayed in a.sub.1; a "mark for interconnecting no indicium" is stationarily displayed in a.sub.2; a "mark for interconnecting indicium in a left sloping direction" is stationarily displayed in a.sub.3; a "mark for interconnecting indicium in both right and left sloping directions" is stationarily displayed in a.sub.4.

In this state, the indicium displayed in the first display areas A.sub.11 and A.sub.22 are identical with each other. Further, the indicium are deemed as being adjacent to each other by the mark displayed in the second display area a.sub.1. Hence, an adjacent relationship A.sub.11-A.sub.22 is established. Similarly, the indicium displayed in the first display areas A.sub.22 and A.sub.23 are identical with each other, and the indicium are deemed as being adjacent to each other by the mark displayed in the second display area a.sub.4. Hence, an adjacent relationship A.sub.22-A.sub.33 is established. Consequently, there is established an adjacent relationship A.sub.11-A.sub.22-A.sub.33.

Preferably, a line connecting two first display areas situated both ends of the first display areas showing the identical kind of indicium and connected by the mark displayed on the at least one of the second display areas is regarded as a winning line.

In such a configuration, when many adjacent relationships are established, a status which can become more advantageous to the player can be provided. Further, complexity of the condition for offering a gaming value, which would otherwise be caused by the adjacent relationship, can be prevented.

Preferably, the rectangular indicium includes a mark isolating the four first display areas.

In such a configuration, even when the indicium to be displayed in the first display areas are adjacent to each other, the indicium are deemed as not being associated with each other depending on the mark displayed in the second display area, thus providing a new gaming characteristic.

As shown in FIG. 7, when the "mark which does not connect any indicium" appears in the second display area a.sub.2, the indicium displayed in the plurality of first display areas located adjacent to the indicia having the mark are deemed as not being associated with each. The reason for this is that the indicium A.sub.13 and A.sub.22 appearing in the first display area are identical with each other and that, in contrast, the mark displayed in the second display area a.sub.2 does not virtually connect the indicium displayed in the plurality of adjacent first display areas but virtually isolate the indicium displayed in the first display area.

Preferably, a number of winning line obtained is counted without considering kind of the indicium.

As shown in, e.g., FIGS. 8A and 8B, connection of five indicium ".cndot." and connection of two indicium ".box-solid." are presumed to be established in the gaming machine. A difference can be imparted to determination of occurrence of a win depending on whether the indicium are ".cndot." or ".box-solid." According to the invention, the number of winning lines is determined on the basis of two, which is the number of independent lines obtained when identical indicium are virtually connected together, thereby preventing complexity of the condition for offering a gaming value.

It is also possible to determine a win occurrence, in a case where an identical kind of indicium is stationarily displayed on at least two of the display areas which are adjacently arranged on the display via a side of the hexagonal shape in a left and right direction except a vertical arrangement of the identical kind of indicium stationarily displayed in the display area excluding at least a display area located in a most left or right position in the display. In this case, the winning line is established by, for example, b sub 62 and b sub 53 as shown in FIG. 8B.

Preferably, the indicium includes a special indicia which substitutes all kinds of the indicium.

Here, the special indicia means a so-called wild card. As a result of this special indicia being stationarily displayed, identical indicium are adjacent to each other, thereby enhancing a gaming characteristic further.

According to the invention, there is also provided a gaming machine, comprising:

a plurality of first display areas connected with each other, each operable to variably and stationarily display one kind of plural octagonal indicium; and a plurality of second display areas separated from each other and connected with four of the first display areas, each operable to variably and stationarily display one kind of plural rectangular indicium.

In such a configuration, there is provided a novel display manner of simultaneously displaying octagonal indicium and rectangular indicium. Hence, amusements for the player can be enhanced.

Preferably, the gaming machine is a slot machine.

According to the invention, there is also provided a method of controlling a gaming machine performed by a computer, comprising steps of:

providing a display, including a plurality of display areas connected with each other, each operable to variably and stationarily display one kind of plural hexagonal indicium; and determining a win occurrence, in a case where an identical kind of indicium are stationarily displayed on at least two of the display areas which are adjacently arranged on the display.

Preferably, a line connecting two display areas situated both ends of the display areas showing the identical kind of indicium and adjacently arranged is regarded as a winning line.

Preferably, the win occurrence is determined except a case where an identical kind of indicium are stationarily displayed on the display areas which are adjacently arranged in either an immediate horizontal direction or an immediate vertical direction.

According to the invention, there is also provided a method of controlling a gaming machine performed by a computer, comprising steps of:

providing a display, including a plurality of first display areas connected with each other, each operable to variably and stationarily display one kind of plural octagonal indicium, and a plurality of second display areas separated from each other and connected with four of the first display areas, each operable to variably and stationarily display one kind of plural rectangular indicium; and determining a win occurrence, in a case where an identical kind of indicium are stationarily displayed on at least two of the first display areas and the second display areas which are adjacently arranged on the display.

Preferably, a line connecting two display areas situated both ends of the display areas showing the identical kind of indicium and adjacently arranged is regarded as a winning line.

According to the invention, there is also provided A method of controlling a gaming machine performed by a computer, comprising steps of:

providing a display, including a plurality of first display areas connected with each other, each operable to variably and stationarily display one kind of plural octagonal indicium, and a plurality of second display areas separated from each other and connected with four of the first display areas, each operable to variably and stationarily display one kind of plural rectangular indicium including a mark connecting at least two of the four first display areas; and determining a win occurrence, in a case where an identical kind of indicium are stationarily displayed on at least two of the first display areas connected by the mark stationarily displayed on at least one of the second display areas.

Preferably, a line connecting two first display areas situated both ends of the first display areas showing the identical kind of indicium and connected by the mark displayed on the at least one of the second display areas is regarded as a winning line.

Preferably, the rectangular indicium includes a mark isolating the four first display areas.

Preferably, a number of winning line obtained is counted without considering kind of the indicium.

Preferably, the indicium includes a special indicia which substitutes all kinds of the indicium.

According to the invention, there is also provided a method of controlling a slot machine performed by a computer, comprising steps of:

providing a plurality of first display areas connected with each other, each operable to variably and stationarily display one kind of plural octagonal indicium; and providing a plurality of second display areas separated from each other and connected with four of the first display areas, each operable to variably and stationarily display one kind of plural rectangular indicium.

According to the invention, there is also provided a computer-readable storage medium, in which a program for causing a computer to execute any one of the above control methods is stored.

BEST MODE FOR CARRYING OUT THE INVENTION

Preferred embodiments of the invention will be described in detail with reference to the accompanying drawings. The invention will now be described by use of a slot machine as an example of a gaming machine. However, the invention is not limited to the slot machine. The invention can be applied to all gaming machines, so long as the gaming machine has a display where any one of a plurality of kinds of indicium, which are variably displayed and can be stationarily displayed in respective display areas at predetermined timings, are to be displayed, as in the case of, e.g., a token gaming machine.

Throughout the specification, the term "indicia" refers to indicium which can be visually identified, such as characters, symbols, designs, patterns, or the like.

Here, the term "variable display" is a concept including both or either a case where indicium are sequentially changed, for example, a case where one indicia "1" is changed to another indicium "2"; a case where a symbol "5" is changed to another symbol ".star."; or when one indicia is moved to another location and displayed in that location while being displayed in a variable display machine capable of variably displaying indicium, e.g., a case where one symbol "7" is moved in the display area while being displayed (i.e., a scroll display).

The term also encompasses a case where a manner to display indicium is changed, e.g., a case where one symbol "7" is displayed in a modified form, such as a horizontally-oriented layout or a vertically-oriented layout and a case where the symbol is displayed in a reduced size.

In contrast, the term "stationarily display" indicates a manner to stationarily display a certain indicia at a predetermined position.

Figure 1:
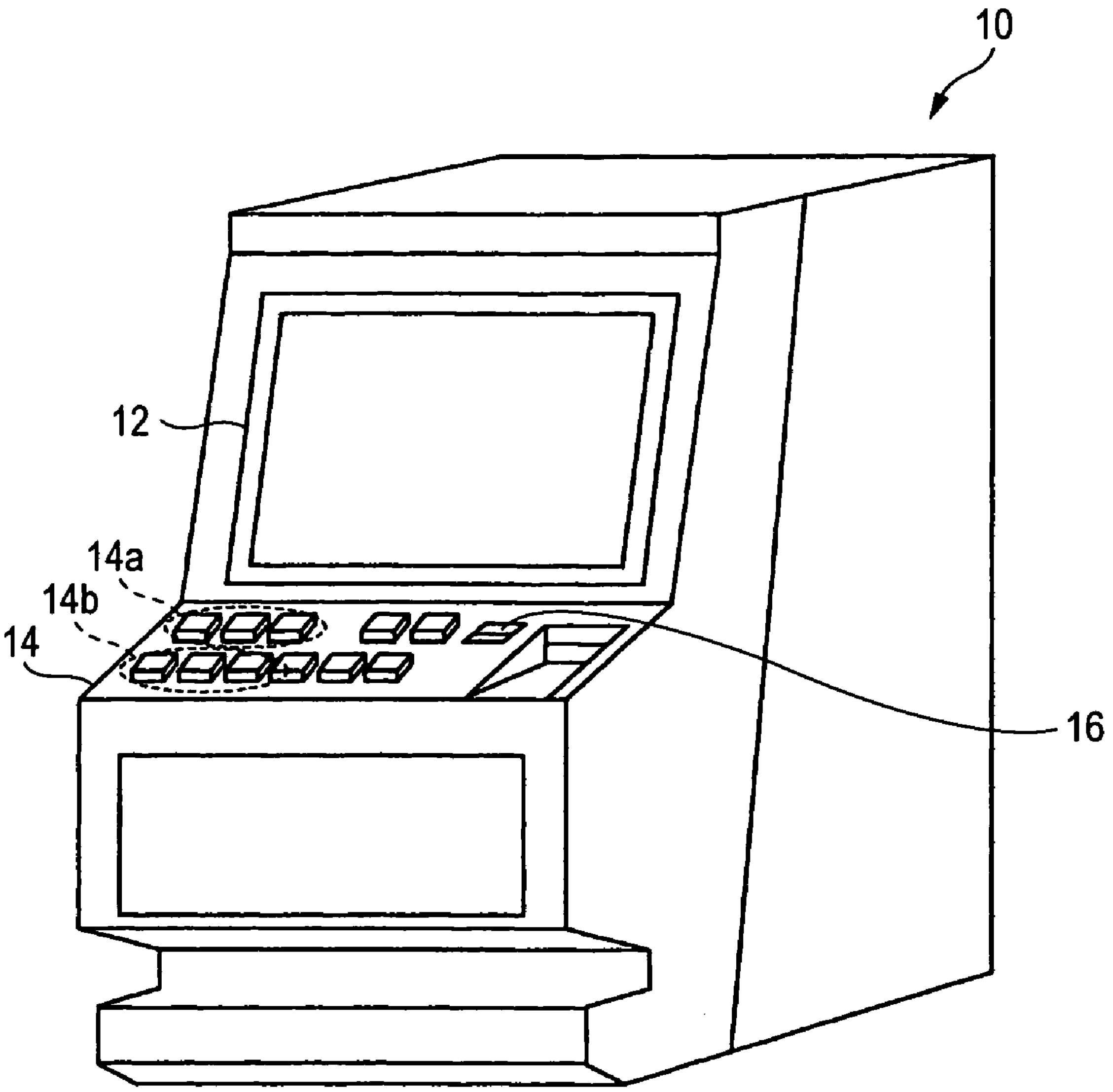
FIG. 1 is a perspective view showing an external appearance of a gaming machine according to a first embodiment of the invention.

A slot machine 10 shown in FIG. 1 is roughly constituted of a control panel 14 by way of which a player changes a game status, and a display 12 which displays the game status. A game is started by the player inserts tokens into a token insertion slot 16 provided on the right side of the control panel 14.

Figure 9A:
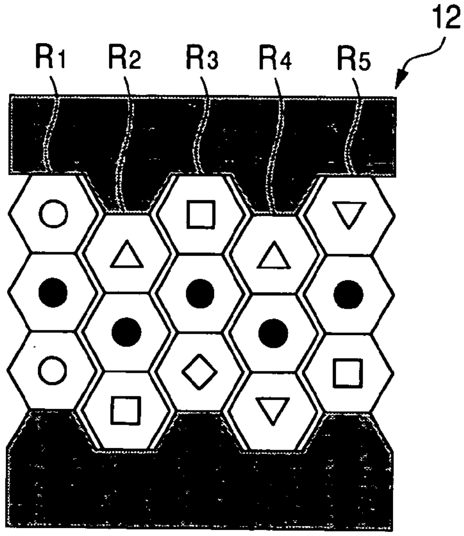
FIGS. 9A to 9E are views showing variable display/stationary display of the indicium shown in a display in the gaming machine of the first embodiment.

A plurality of display areas to be used for displaying a plurality of indicium are provided in the display 12. In relation to the thus-constituted display areas, the display areas arranged in such a direction as to constitute a single reel (video reel). Hereinafter, this direction is referred as a "reel rotating direction". For example, as shown in FIG. 9A, a first reel R.sub.1, a second reel R.sub.2, a third reel R.sub.3, a fourth reel R.sub.4, and a fifth reel R.sub.5 are displayed in the display 12, in this sequence from the left.

A stop button 14*b* to be used for stopping a reel and stationarily displaying indicium is provided in the control panel 14 of the slot machine shown in FIG. 1. In the gaming machine 10 of the embodiment, five stop buttons 14*b* are used for performing stationary display control of the first reel R.sub.1, the second reel R.sub.2, the third reel R.sub.3, the fourth reel R.sub.4, and the fifth reel R.sub.5 appearing in the display 12. When stationary display control of the indicia is performed automatically by the gaming machine, the stop buttons 14*b* may be omitted.

The control panel 14 of the slot machine 10 is provided with BET buttons 14*a* to be used for selecting a BET range, thereby selecting a BET range to be validated.

Figure 2:
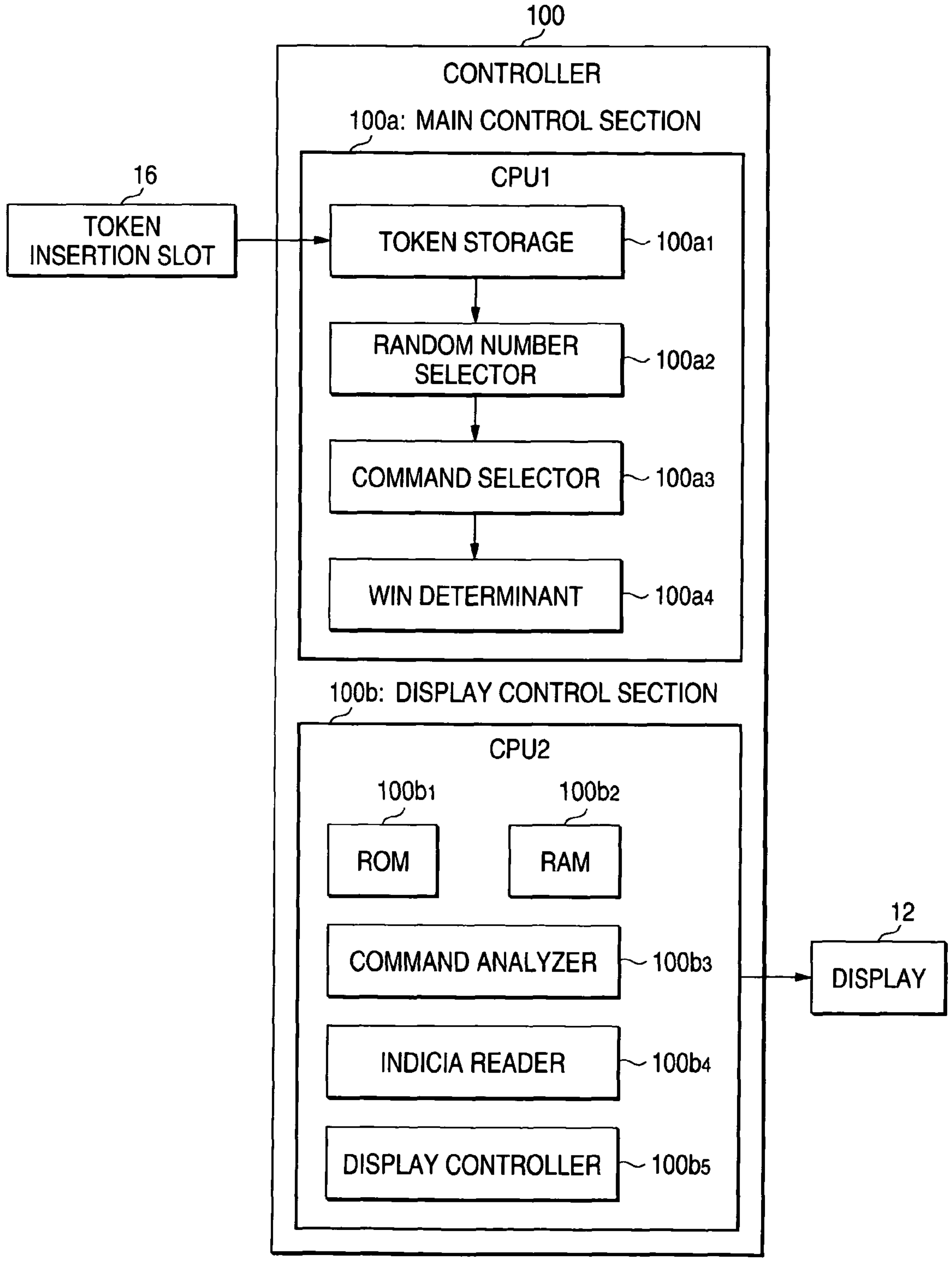
FIG. 2 is a block diagram showing a hardware configuration of the gaming machine.

As shown in FIG. 2, a controller 100 of the slot machine 10 comprises a main control section 100*a* for determining occurrence of a win, and a display control section 100*b* for controlling display operation of the display 12.

First, the main control section 100*a* comprises a token storage 100*a*.sub.1 which detects tokens inserted through the token inlet slot 16 and stores the detected tokens; a random number selector 100*a*.sub.2 for effecting an internal lottery of a game status when a game is started by betted tokens; a command selector 100*a*.sub.3 which outputs a command signal showing a game status in accordance with a signal output from the random number selector 100*a*.sub.2; and a win determinant 100*a*.sub.4 which determines occurrence of a win in accordance with the command signal output from the command selector 100*a*.sub.3.

In addition to the detection of the tokens inserted by way of the token insertion slot 16 and stores the thus-inserted tokens, the token storage 100*a*1 also stores the remaining number of tokens by subtracting the number of tokens bet from the number of tokens inserted. In accordance with the information stored in the token storage 100*a*.sub.1, the number of tokens owned by the player can also be displayed.

When a game is started, the random number selector 100*a*.sub.2 performs an internal lottery of a game status by selecting one from previously-stored random numbers. One random number is selected, and the thus-selected numerical value is output to the command selector 100*a*.sub.3.

The command selector 100*a*.sub.3 selects one of commands which are set in association with respective selected numerical values. On the basis of the random number (numerical value) selected by the random number selector 100*a*.sub.2, a pattern of indicia is stationarily displayed in the display 12. The command selector 100*a*.sub.3 outputs the thus-selected command signal to the win determinant 100*a*.sub.4.

In accordance with the command signal determined by the command selector 100*a*.sub.3, the win determinant 100*a*.sub.4 determines occurrence of a win. Specifically, in connection with the plurality of indicium stationarily displayed in the display 12, a determination is made as to whether or not a relative positional relationship between the indicium is identical with a predetermined pattern; for example, whether or not identical indicium are adjacent to each other. If this requirement is satisfied, occurrence of a win is determined on the basis of the relationship. A specific way in which the win determinant 100*a*.sub.4 determines occurrence of a win will be described later.

The display control section 100*b* comprises a ROM 100*b*.sub.1; a RAM 100*b*.sub.2; a command analyzer 100*b*.sub.3; an indicia reader 100*b*.sub.4; and a display controller 100*b*.sub.5.

Here, stored in the ROM 100*b*.sub.1 are a display control program for performing variable and stationary display of indicia, and image data pertaining to all indicium required for running the display control program. Image data pertaining to all indicia images stored in the ROM 100*b*, are read and stored in the RAM 100*b*.sub.2 at the time of activation (resetting) of the slot machine 10.

The command analyzer 100*b*.sub.3 receives a command signal output from the command selector 100*a*.sub.3 and decodes the signal. On the basis of the decoding (analyzing) operation, a corresponding display control program is read from the ROM 100*b*.sub.1.

The main control section 100*a* and the display control section 100*b*, which controls display operation of the display, are electrically connected together, thereby exchanging a signal. Specifically, the indicia read from the RAM 100*b*.sub.2 is read by the indicia reader 100*b*.sub.4 in accordance with contents of a display control program, as required. A display controller 100*b*.sub.5 variably displays the thus-read indicia on the display 12 in accordance with contents of a display control program. Identification information matching the indicia specified by the command selector 100*a*.sub.3 is stationarily displayed.

Figure 3:
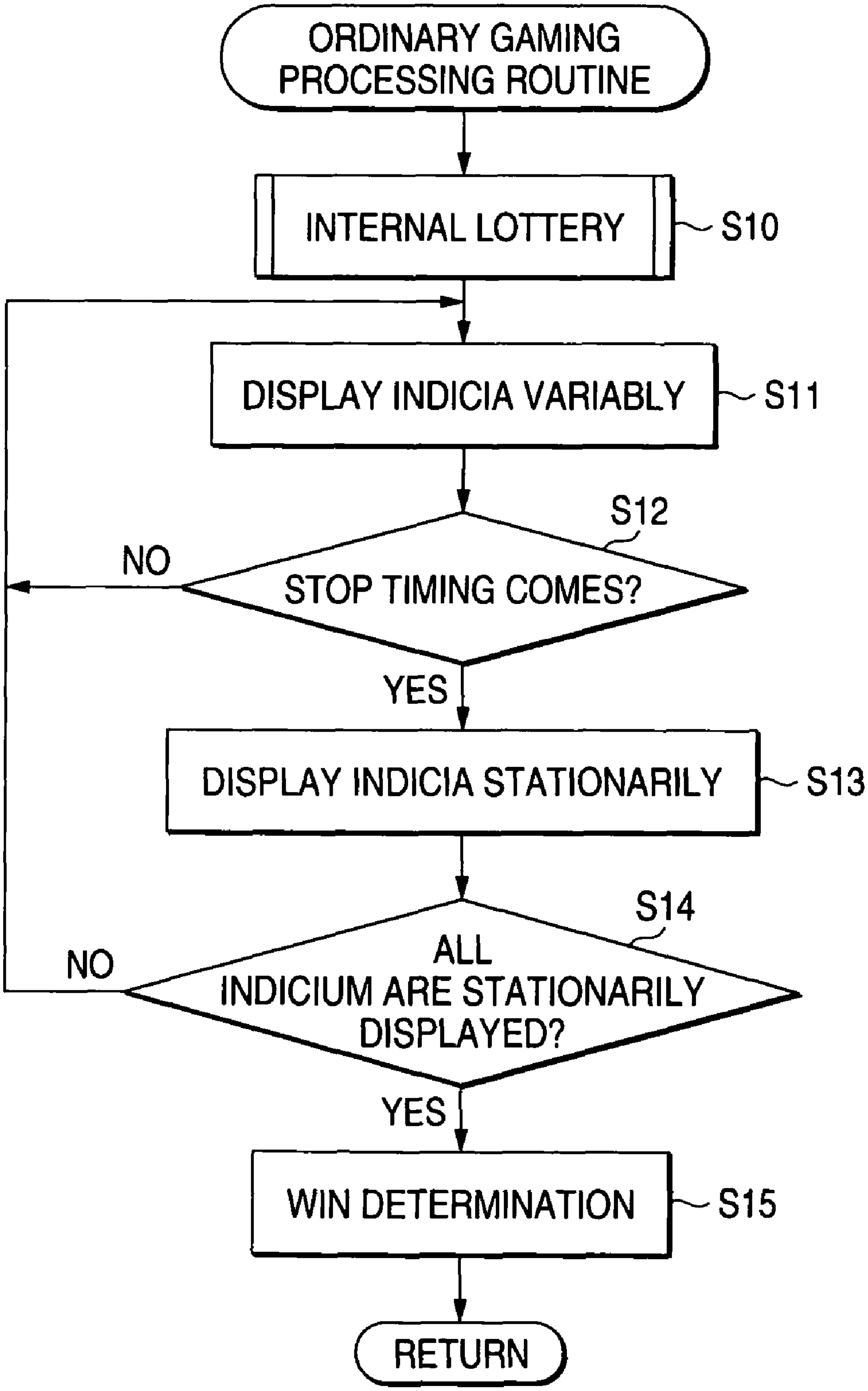
FIG. 3 is a flowchart showing an ordinary game processing routine executed in the gaming machine.

An ordinary game processing routine of the gaming machine is executed in accordance with the flow shown in FIG. 3. First, internal lottery is performed when the player has completed inputting the number of tokens (step S10). Here, the internal lottery is for sampling random numerical values at given intervals from random number sequences produced by a random number sequence circuit provided in the random number selector 100*a*.sub.2, and to compare the thus-sampled numerical values with predetermined data stored in the ROM 100*b*.sub.1, thereby determining the indicia to be stationarily displayed on the display 12. On the basis of the thus-determined indicia, a determination is made as to whether or not a win has arisen. If a win has arisen, the pattern of the win (e.g., provision of a status which can become advantageous to the player) is determined.

Then, variable display of the indicia is started (step S11). Processing pertaining to this step is iterated until all the indicium are determined to have been stationarily displayed in step S14.

After the indicium have been variably displayed, a determination is made as to whether or not the indicium are to be stationarily displayed, on the basis of actuation of the stop buttons 14*b* performed by the player or lapse of a predetermined time period (step S12).

When the indicium are determined to be stationarily displayed, the indicia is stationarily displayed on a per-reel basis (step S13). Stationary display of the indicia is performed on the basis of details of flags set through the internal random sampling performed in step S10. If in step S12 the indicium are determined not to be stationarily displayed, processing returns to step S11, wherein variable display of the indicia is continued.

In step S13 the indicium of the respective reels are stationarily displayed, and a determination is made as to whether or not all the indicium are stationarily displayed (step S14).

When all the indicium are determined to have been stationarily displayed, win determination processing is performed (step S15). The win determination processing is performed in accordance with a win determination processing routine to be described later. In contrast, if in step S14 not all the indicium are determined to have been stationarily displayed, processing returns to step S11, thereby sequentially, stationarily displaying the indicium that are being variably displayed.

As a result of completion of the win determination processing performed in step S15, a result of the win determination operation is reflected on the gaming machine, whereupon a shift to a state which can be advantageous to the player is effected.

Figure 4:
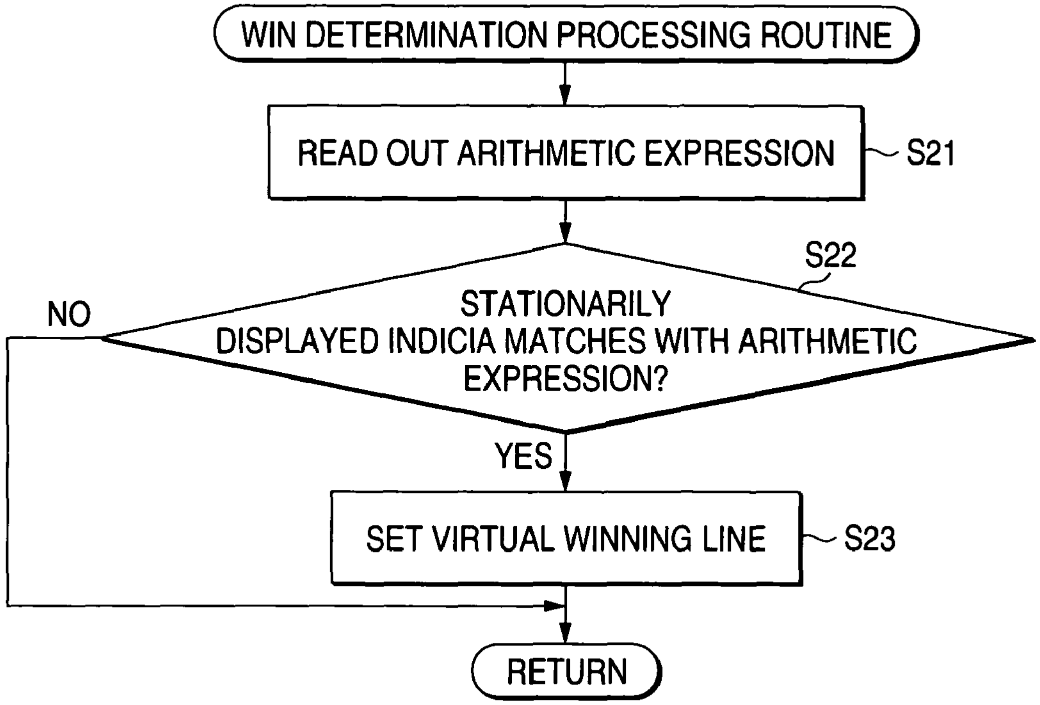
FIG. 4 is a flowchart showing a win determination processing routine executed in the gaming machine.
Figure 5:
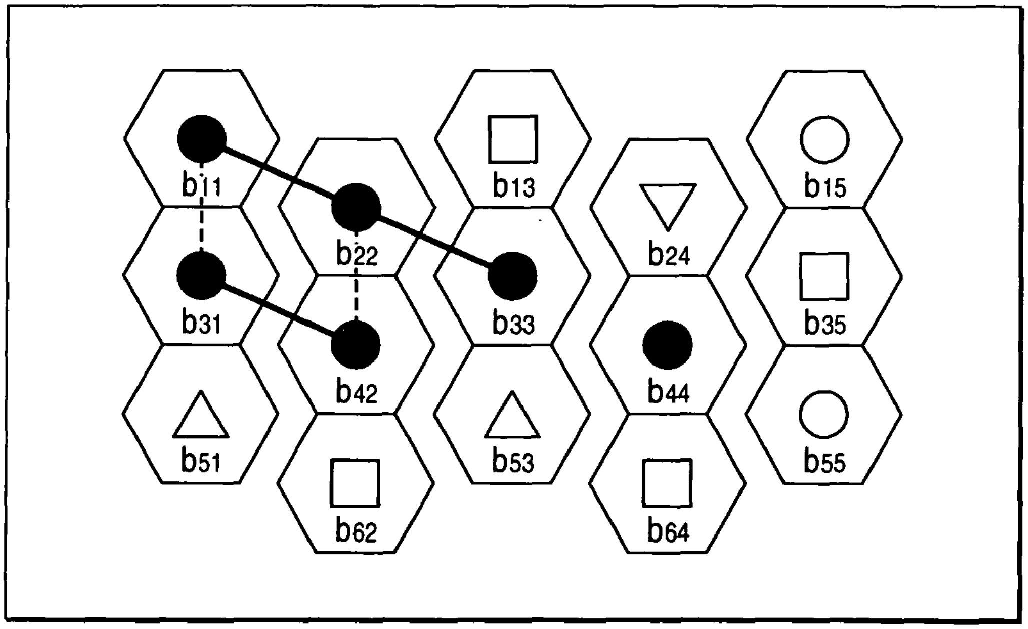
FIG. 5 is a view showing a first example of stationary display of indicia displayed in a display.
Figure 6A:
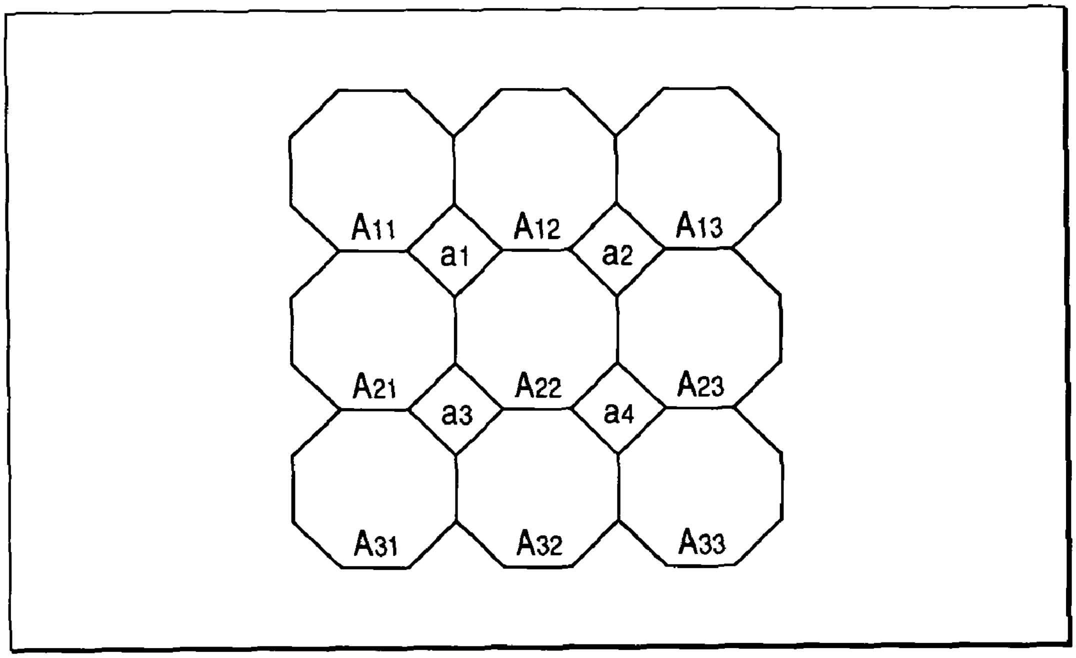
FIGS. 6A and 6B are views showing a second example of stationary display of indicia displayed in the display.
Figure 6B:
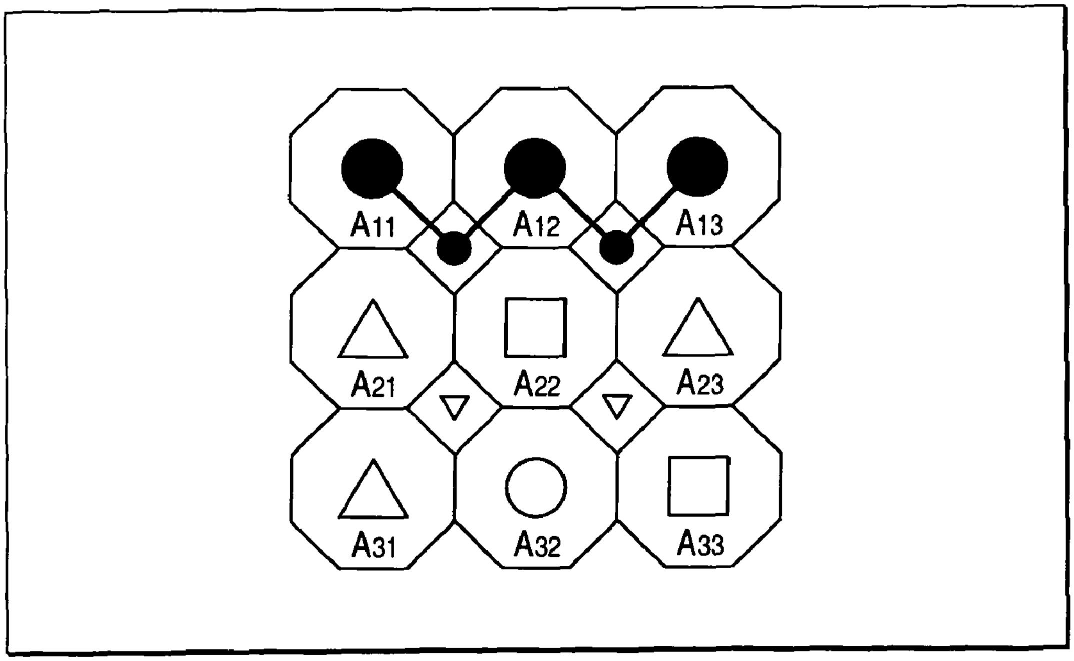
Figure 7:
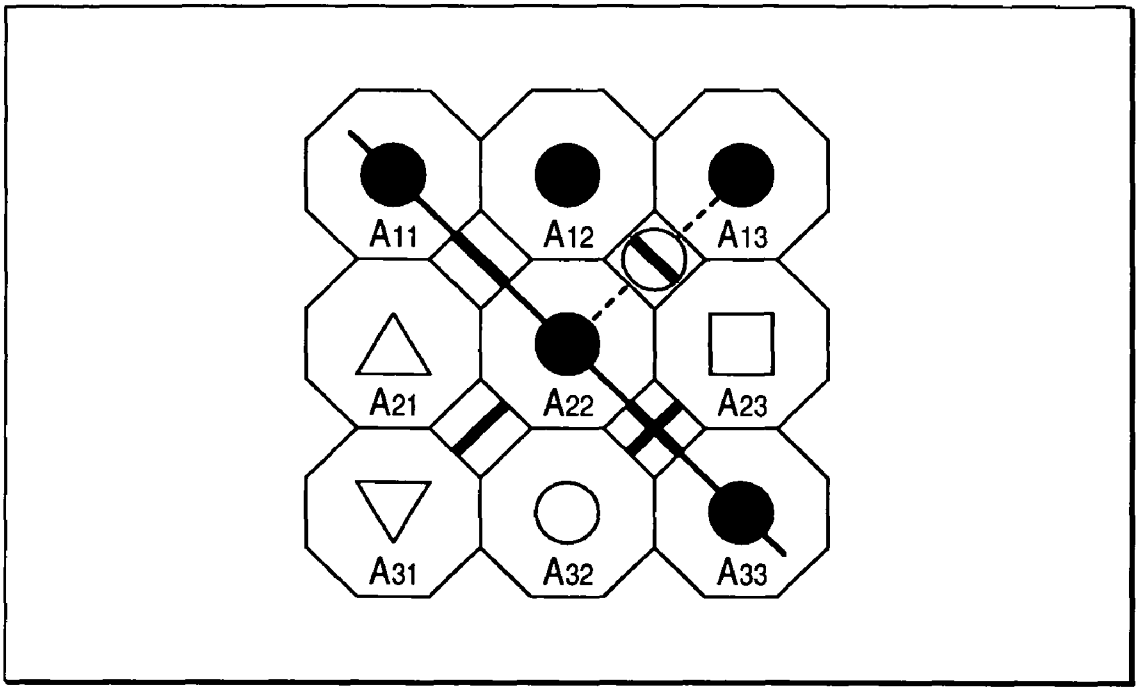
FIG. 7 is a view showing a third example of stationary display of indicia displayed in the display.
Figure 8A:
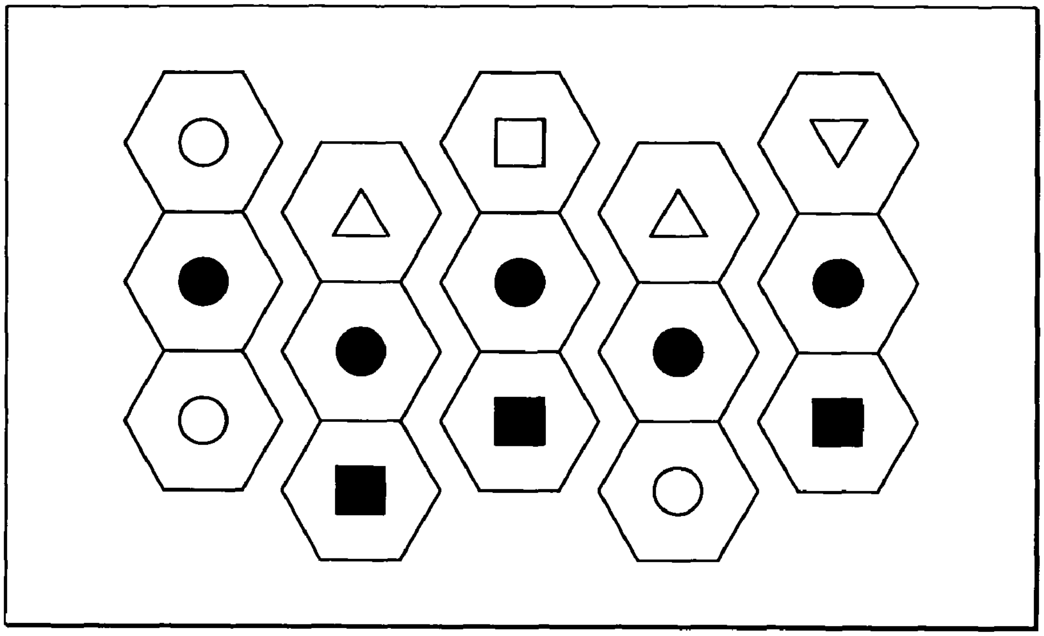
FIGS. 8A and 8B are views showing a fourth example of stationary display of indicia displayed in a display.
Figure 8B:
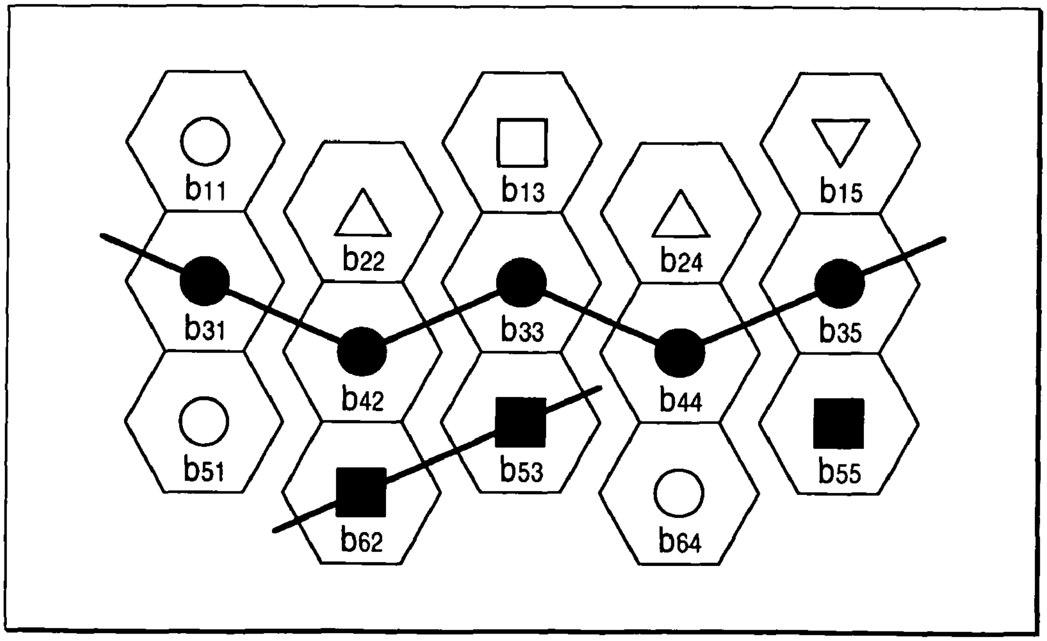

As shown in FIG. 4, the game processing routine to be performed by the gaming machine of the embodiment is started as a result of all the indicium being stationarily displayed (step S14 shown in FIG. 3). The pattern of stationary display of the indicia is converted into numerical value information. Processing proceeds by applying the numerical value information to a predetermined arithmetic expression.

First, an arithmetic expression to be used for determining a win is loaded (step S21). The expression is determined so as to correspond to a win determination rule. Information about a predetermined arithmetic expression previously stored in the ROM 101*b*.sub.1 is transmitted to the RAM 100*b*.sub.2.

Next, a determination is made as to whether or not a match exists between the stationarily-displayed indicia and the predetermined arithmetic expression (step S22). For example, indicium of different types are converted into respective binary indicium. The resultant binary indicium are applied to the arithmetic expression, thereby determining whether or not the indicium coincide with the expression. Thus, a determination can be made by use of a so-called comparator or the like.

Here, when the stationarily-displayed indicium and the predetermined arithmetic expression are determined to coincide with each other, a virtual line which virtually connects together a plurality of display areas can also be set among the indicium that have satisfied the predetermined arithmetic expression (i.e., the adjacent indicium) at step S23. Specifically, in order to inform the player that a winning line has been set as a result of occurrence of a win, a slot machine which blinks/illuminates a winning line lamp (not shown) provided between a plurality of display areas of the display 12 enables control of a corresponding winning line lamp on the basis of the information about setting of the virtual line.

In this way, a determination is made as to whether or not a "win" or "failure" has arisen in the game, by determination operation pertaining to step S22, whereby the sub-routine is completed.

A specific way to determine occurrence of a win, in which hexagonal indicium are variably displayed (a win which can be advantageous to the player is provided), will be described by reference to FIGS. 9A to 9E.

As shown in FIG. 9A, hexagonal indicium are vertically connected together, whereby one connected information set is displayed in the form of a reel of a rotary slot or video slot in the display 12 of the gaming machine according to the embodiment. FIG. 9A shows a case where five reels are arranged side by side in the display 12 such that three indicium are displayed on each reel.

Figure 9B:
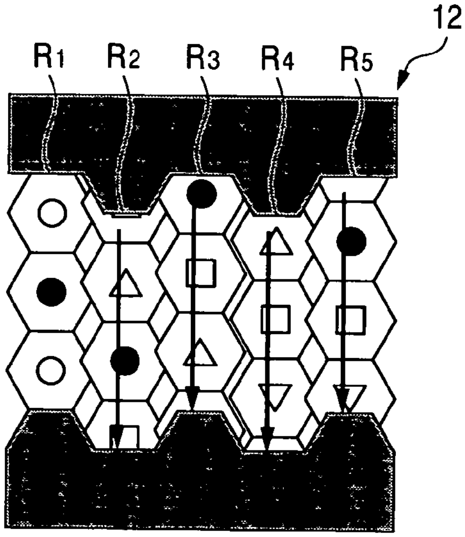

FIG. 9B shows that the indicium are variably displayed (in a scrolled manner) in the display 12 while being connected together. The left-most first reel has already stopped.

Figure 9C:
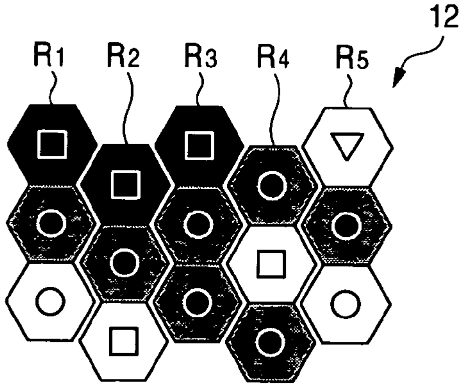
Figure 9D:
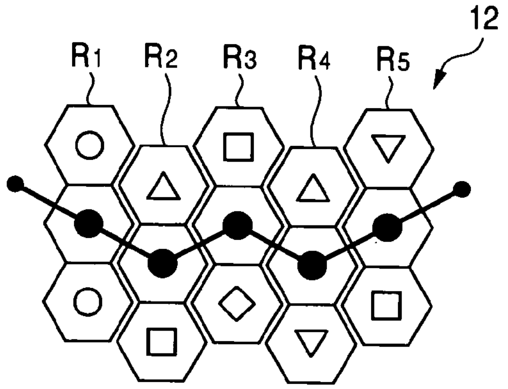
Figure 9E:
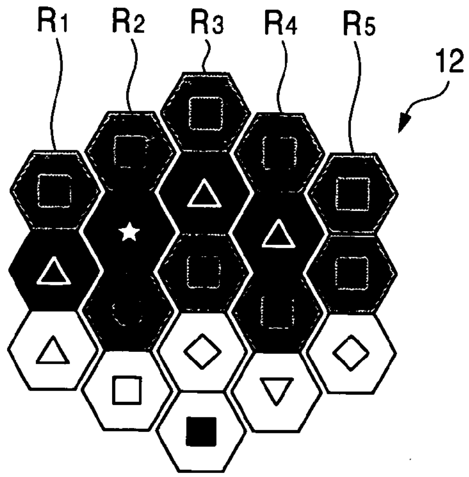

FIGS. 9C to 9E show that all the reels remaining in a state shown in FIG. 9B, in which the indicium are variably displayed, are brought to a stop, thereby stationarily displaying the indicium.

The specific way to determine occurrence of a win will be described by reference to FIG. 9C. From among the stationarily-displayed indicium, a set of three adjacent indicium ".box-solid." and a set of seven adjacent indicium ".cndot." are established. Accordingly, occurrence of a win is determined on the basis of such patterns of stationarily-displayed indicium, and a status which can become advantageous to the player is offered.

When an additional rule that an adjacent relationship existing between indicium with respect to the reel rotating direction is not included is added to the definition of the adjacent relationship, sets of indicium which are adjacent to each other with respect to the reel rotating direction are set as separate winning lines. Therefore, a set of five adjacent indicium ".cndot.," a set of four adjacent indicium ".cndot." and a set of three adjacent indicium ".box-solid." are established.

Here, the expression "adjacent relationship existing between indicium with respect to the reel rotating direction is not included" means that indicium involving such a relationship are branched into independent winning lines.

The specific way to determine occurrence of a win will be described by reference to FIG. 9D. Among the stationarily-displayed indicium, a set of five adjacent indicium ".cndot." are established. A total of five indicium can be connected in 29 different ways such that the indicium are connected at their sides to adjacent indicium while passing through one location on each reel. Therefore, winning lines can be set in advance as patterns in which predetermined indicium are arranged in a relative positional relationship.

FIG. 9E shows an example of a case where the number of indicium to be displayed on each reel is changed. Specifically, three indicium are displayed on the first reel R.sub.1; four indicium are displayed on the second reel R.sub.2; five indicium are displayed on the third reel R.sub.3; four indicium are displayed on the fourth reel R.sub.4; and three indicium are displayed on the fifth reel R.sub.5. Thus, a novel pattern of display of the indicium can be provided to the player.

Here, an indicia ".star." serving as a "wild card" which can replace all types of indicium is displayed on the second reel R.sub.2. Accordingly, nine adjacent indicium ".box-solid." including the indicia ".star."; four adjacent indicium ".tangle-solidup." including the indicia ".star."; and two adjacent indicium ".cndot." including the indicia ".star." are established.

If the rule that "adjacent relationship existing between indicium with respect to the reel rotating direction is not included" is added to the definition of the adjacent relationship, the indicium which are adjacent to each other with respect to the reel rotating direction are set as separate winning lines. Hence, five adjacent indicium ".box-solid."; five adjacent indicium ".box-solid." including the indicia ".star."; and four adjacent indicium ".tangle-solidup." including the indicia ".star." are established.

The above description is based on the premise that the indicium are displayed in the form of a video display through use of, e.g., a CRT. However, the invention is not limited to the video display. The indicium may be displayed through use of mechanical reels. In this case, the indicium on the reels are identified by a position sensor provided in the gaming machine, thereby determining whether or not identical indicium are adjacent to each other over a plurality of display areas.

As mentioned above, the configuration of a display of a so-called rotary slot machine using mechanical reels will be described by reference to FIGS. 10 through 14.

Figure 10A:
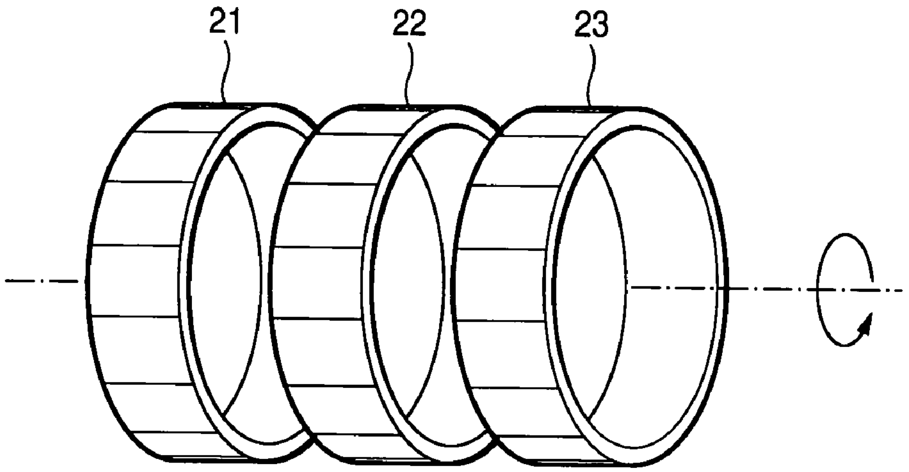
FIGS. 10A and 10B are views showing rotation of rotary drums of a gaming machine according to a second embodiment.

FIG. 10A is a view showing rotation (of drums) of the gaming machine according to a second embodiment. Three drums 21, 22, and 23 for rotary purposes are provided. The axis of rotation of the drum 21, that of the drum 22, and that of the drum 23 are aligned with the center axis. Spinning action of the drum 21, that of the drum 22, and that of the drum 23 are controlled independently.

Figure 10B:
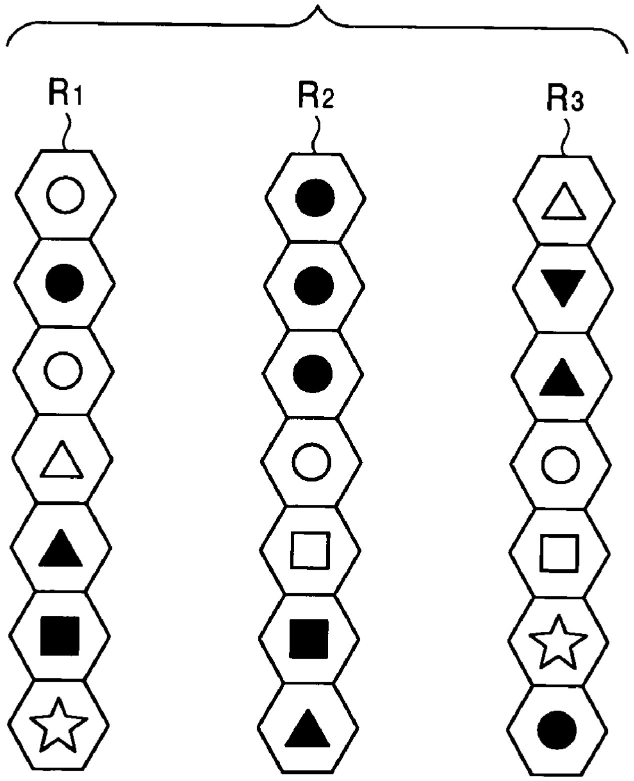

Reels R.sub.1, R.sub.2, and R.sub.3 shown in FIG. 10B are affixed to respective outer peripheral surfaces of the drums 21, 22, and 23 such that a plurality of indicium are displayed in a row in a circumferential direction. Identification indicium displayed on the reels R.sub.1, R.sub.2, and R.sub.3 shown in FIG. 10B assume a hexagonal geometry. As a result of those indicium being affixed to the respective drums, a plurality of indicium assuming a hexagonal geometry are displayed on the display 12.

When the hexagonal indicium are variably displayed, contact may arise between the indicium, depending on an interval between the drums 21, 22, and 23, and such contact hinders physical variable display. In this case, there is adopted a measure for making the diameters of the drums different from each other and alternately arranging drums of different diameters (e.g., R.sub.1=R.sub.3>R.sub.2).

Figure 11A:
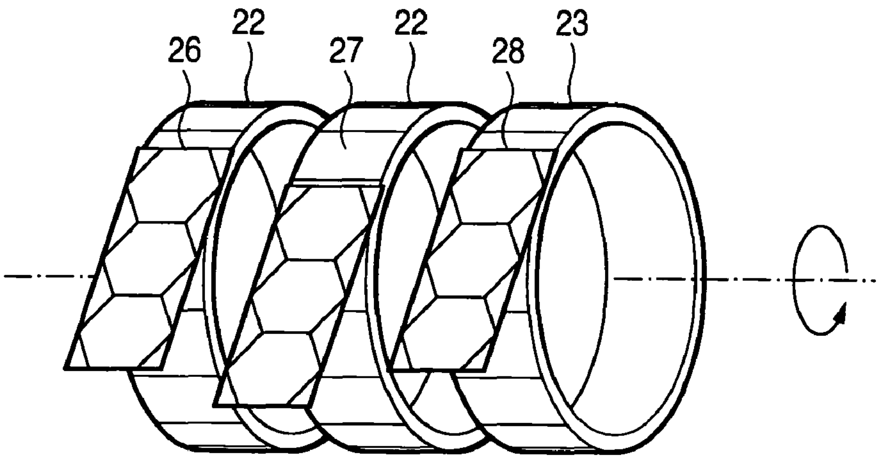
FIGS. 11A to 11C are view showing rotation of rotary drums of a gaming machine according to a third embodiment.
Figure 11B:
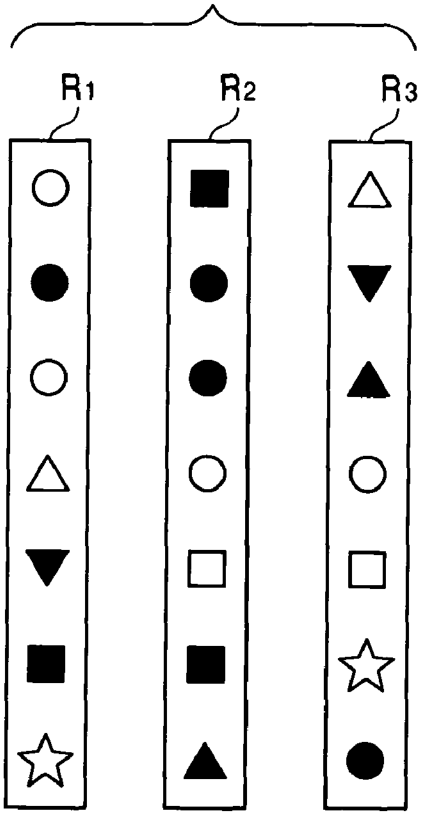

As a third embodiment of the invention, the reels R.sub.1, R.sub.2, and R.sub.3 shown in FIG. 11B are affixed to the outer peripheral surfaces of the respective drums 21, 22, and 23 in a row in a circumferential direction as shown in FIG. 11A. Here, the indicium displayed on the respective reels R.sub.1, R.sub.2, and R.sub.3 shown in FIG. 11B assume a rectangular geometry, which is the same as that of the indicium of the related-art gaming machine.

Figure 11C:
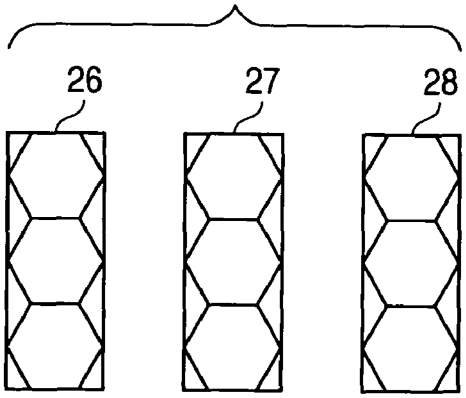

Display windows 26, 27, and 28, which enable setting of geometries of indicium, are provided in the display 12 where the indicium of the reels R.sub.1, R.sub.2, and R.sub.3 are to be displayed. Display areas which have been edged into a hexagonal geometry in advance, such as those shown in FIG. 11C, are provided in the respective display windows 26, 27, and 28. Even when the rectangular indicium are displayed in a spinning manner, the player can view the indicium through the display windows as if hexagonal indicium are displayed in a spinning manner.

The display areas that have been edged into a hexagonal geometry in advance are set in the display windows 26, 27, and 28. However, a variety of changes in the geometry of the indicia such as an octagonal geometry or a dodecagonal geometry, become feasible. Alternatively, ornament lamps, such as LEDs, are arranged into a preset layout. When certain indicium have become adjacent to each other, the lamps can be caused to act as a notifier for offering a status which can become advantageous to the player.

By adoption of the configuration of the display shown in FIGS. 10A through 11C, the hexagonal indicium shown in FIGS. 5 and 9A through 9E can be displayed while being connected together.

As a fourth embodiment of the invention, the configuration of a display of a rotary slot machine which displays octagonal indicium and rectangular indicium will now be described by reference to FIGS. 12A through 14C.

Figure 12A:
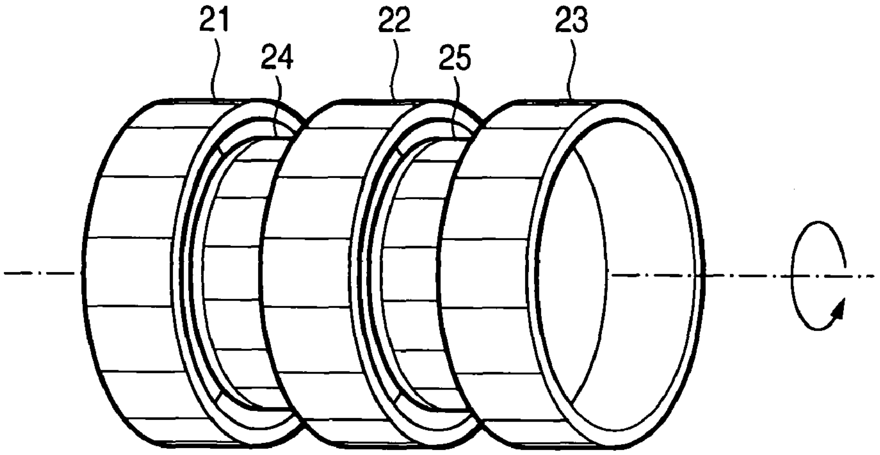
FIGS. 12A and 12B are views showing rotation of rotary drums of a gaming machine according to a fourth embodiment.

As shown in FIG. 12A, drums 21, 22, and 23, and drums 24 and 25, both being smaller in diameter than the drums 21 through 23, are housed in the slot machine. The axis of rotation of the drum 21, that of the drum 22, that of the drum 23, that of the drum 24, and that of the drum 25 are aligned with the center axis; and spinning of the drum 21, that of the drum 22, that of the drum 23, that of the drum 24, and that of the drum 25 are controlled independently.

Figure 12B:
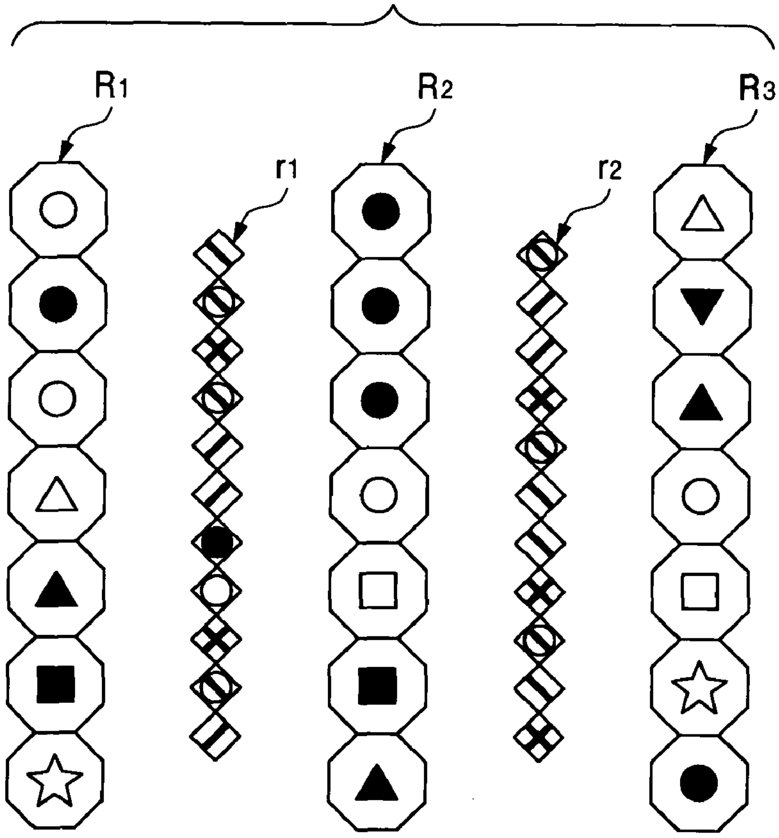

Reels R.sub.1, R.sub.2, and R.sub.3 shown in FIG. 12B are affixed to respective outer peripheral surfaces of the drums 21, 22, and 23 such that a plurality of indicium are displayed in a row in a circumferential direction. Identification indicium displayed on the reels R.sub.1, R.sub.2, and R.sub.3 shown in FIG. 12B assume an octagonal geometry. As a result of those indicium being affixed to the respective drums, a plurality of indicium assuming an octagonal geometry are displayed on the display 12.

Reels r.sub.1, r.sub.2 shown in FIG. 12B are affixed to respective outer peripheral surfaces of the drums 24, 25 such that a plurality of indicium are displayed in a row in a circumferential direction. The indicium displayed on the reels r.sub.1, r.sub.2 shown in FIG. 12B assume a rectangular geometry. As a result of such indicium being displayed, a plurality of rectangular indicium are displayed in the display 12. The drums 21 and 22 (or drums 22 and 23) are arranged in proximity to each other, and the reels r.sub.1, r.sub.2, which are connected together by the rectangular indicium, are located in a rectangular clearance formed when the octagonal indicium are connected together horizontally and vertically. The octagonal indicium are displayed in a connected manner, and the rectangular indicium are displayed in a separated manner as shown in FIG. 14C.

Figure 13:
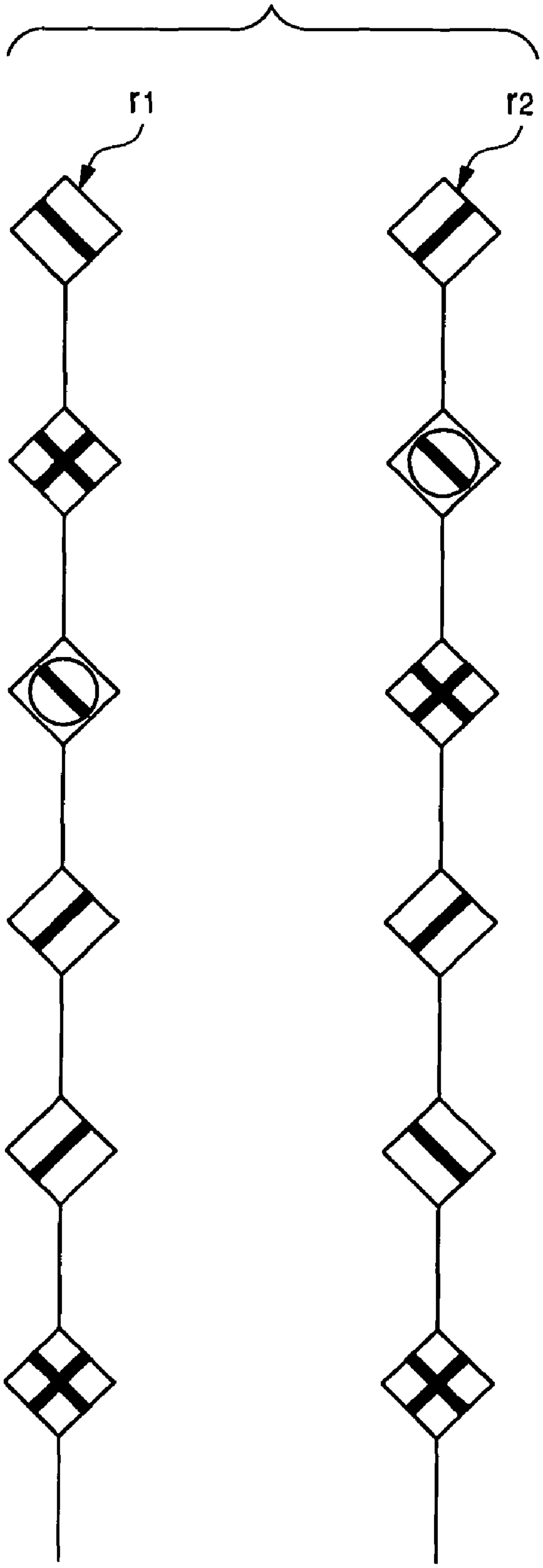
FIG. 13 is a view showing a modified example of reels shown in FIG. 12B.

Accordingly, the rectangular indicium can be omitted by only an amount corresponding to a space between the rectangular indicium. FIG. 13 shows an example configuration of such a reel. In the reels r.sub.1, r.sub.2 shown in FIG. 13, rectangular indicium are connected together with intervals.

Figure 14A:
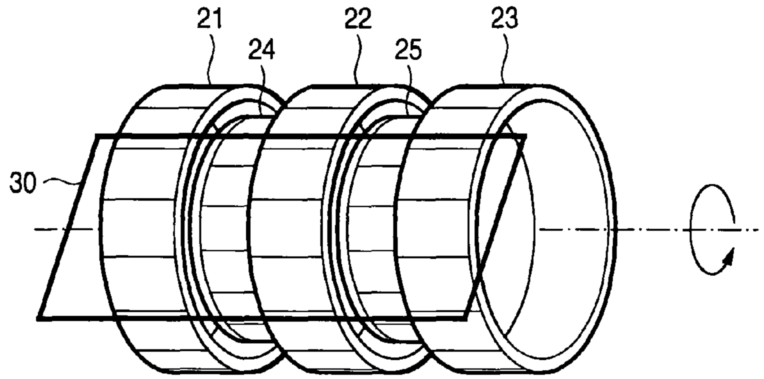
FIGS. 14A to 14C are views showing rotation of rotary drums of a gaming machine according to a fifth embodiment.
Figure 14B:
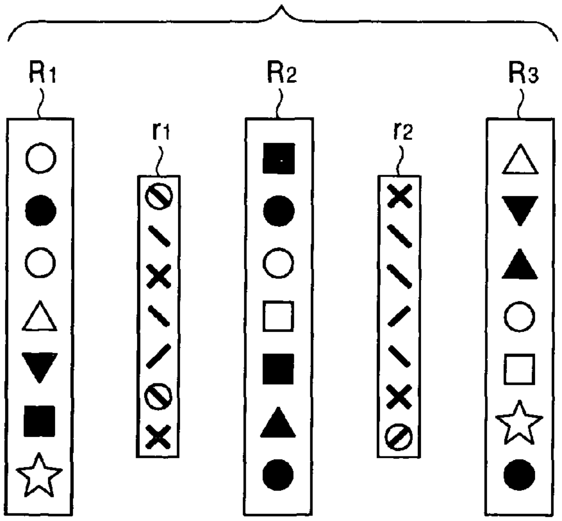
Figure 14C:
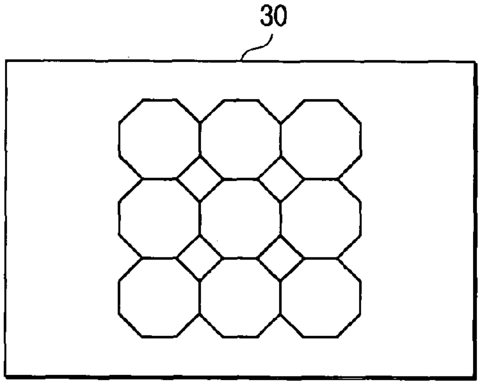
Figure 15:
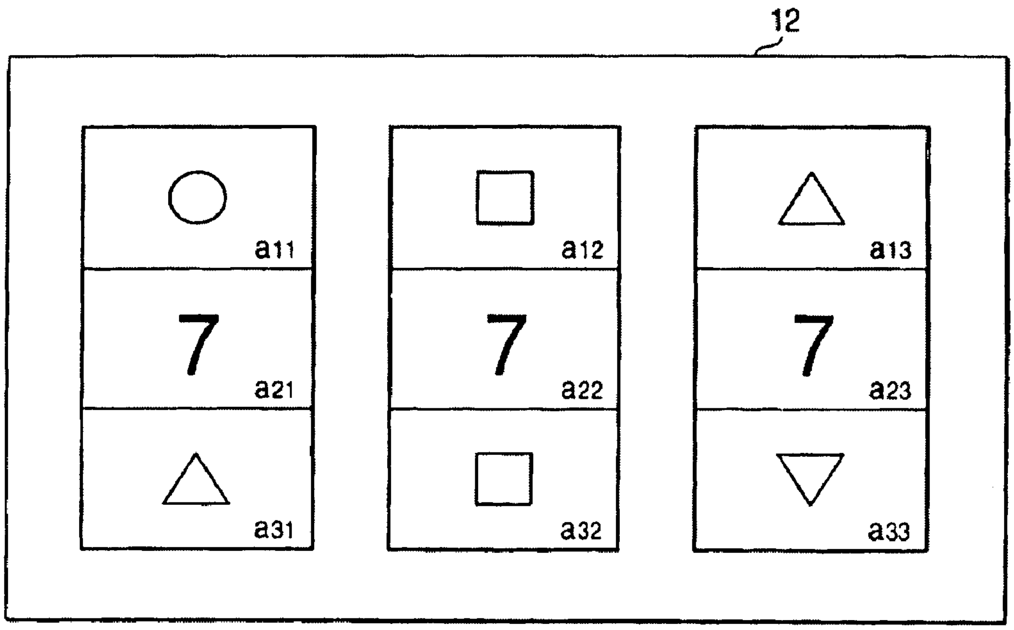
FIG. 15 A Prior Art
FIGS. 15A and 15B are views showing display performed in related-art gaming machines.
Figure 15:
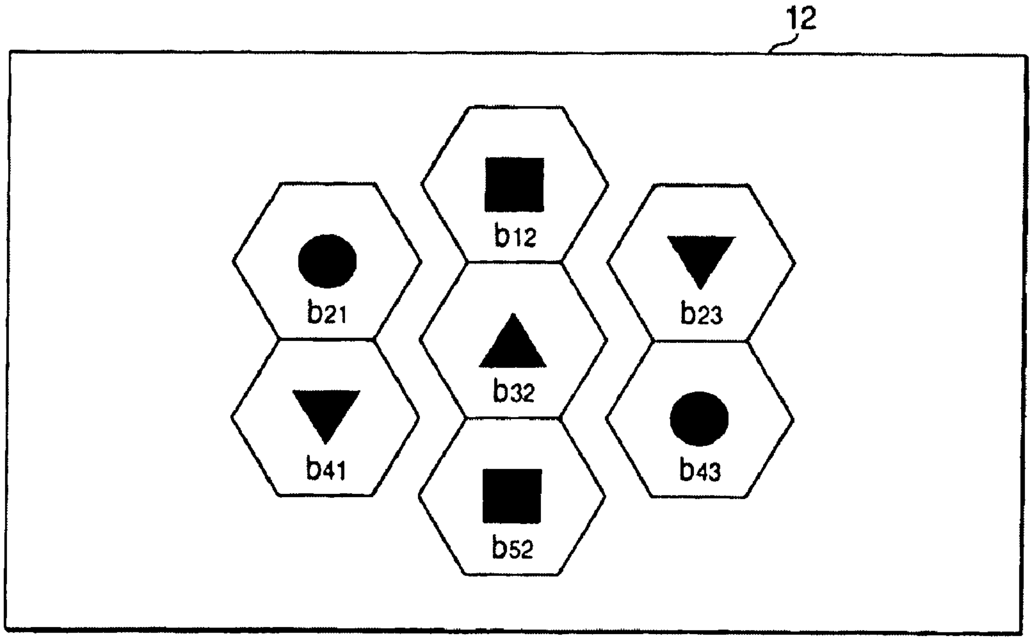
FIG. 15 B Prior Art

FIG. 14A is a view showing a case where a translucent liquid-crystal display 30 is disposed in front of the drums 21, 22, 23, 24, and 25, as a fifth embodiment of the invention. Here, in a reel to be affixed to each of the drums, the rectangular indicium shown in FIG. 14B are connected together.

As a result of use of the translucent liquid-crystal display 30, hindrance to display of indicium to be affixed onto drums, which would otherwise be caused when drums are disposed behind the display, can be prevented. Displaying an image including octagonal and rectangular frames on the liquid-crystal display 30, the same resultant image as shown in FIG. 14C can be obtained.

Hexagonal or dodecagonal frames may be displayed on the liquid-crystal display 30, thereby enabling a variety of changes in the geometry of the indicium.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

The invention claimed is:

1. A gaming machine, comprising:

a display, including a plurality of first display areas connected with each other, each operable to variably and stationarily display an indicium, and a plurality of second display areas connected with four of the first display areas, each operable to variably and stationarily display an indicium including a mark that defines whether an immediately adjacent display area is connected or isolated in win determination.

2. The gaming machine of claim 1, wherein a shape of the first display area is octagonal.

3. The gaming machine of claim 1, wherein a line connecting two first display areas situated both ends of the first display areas showing the identical kind of indicium and connected by the mark displayed on the at least one of the second display areas is regarded as a winning line.

4. The gaming machine of claim 1, wherein an indicum displayed on the second display area includes a mark isolating the four first display areas.

5. The gaming machine of claims 1, wherein a number of winning line obtained is counted without considering kind of the indicium.

6. The gaming machine as set forth of claims 1, wherein the indicium includes a special indicia which substitutes all kinds of the indicium.

* * * * *